Aug. 14, 1956 — M. A. MINISH — 2,758,967
GRIT REMOVAL APPARATUS FOR SEWAGE DISPOSAL PLANTS
Filed Dec. 26, 1951 — 2 Sheets-Sheet 1

INVENTOR.
MERVIN A. MINISH
BY Reynolds, Beach & Christensen
ATTORNEYS

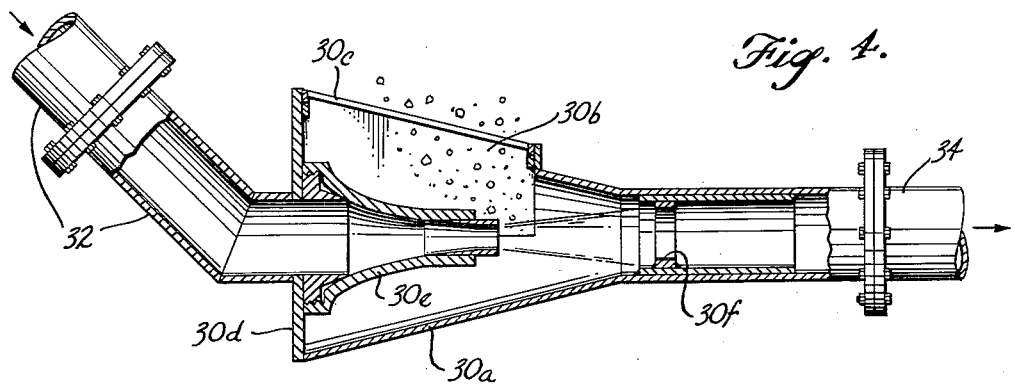
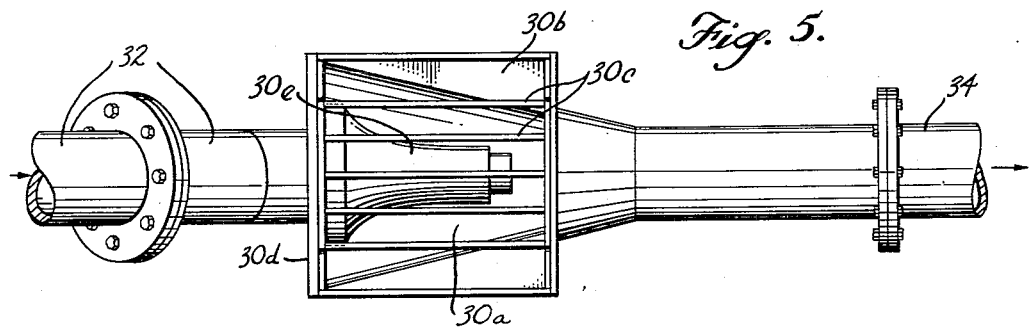
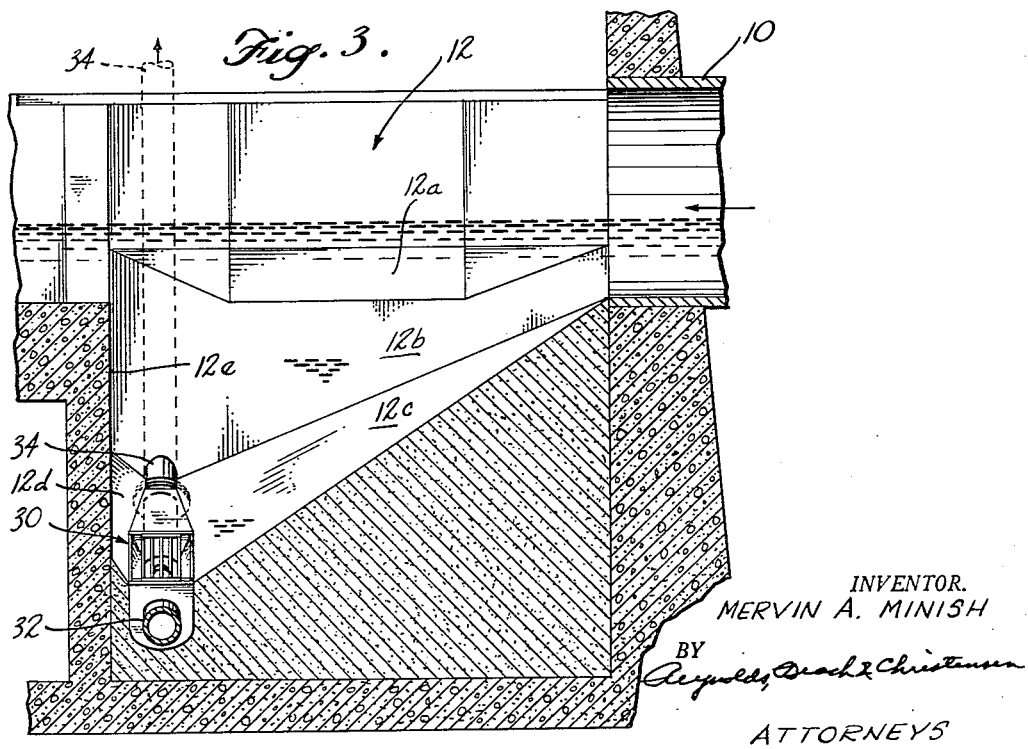

United States Patent Office 2,758,967
Patented Aug. 14, 1956

2,758,967

GRIT REMOVAL APPARATUS FOR SEWAGE DISPOSAL PLANTS

Mervin A. Minish, near Bellevue, Wash., assignor to Beaming Products Company, Inc., Seattle, Wash., a corporation of Washington Application December 26, 1951, Serial No. 263,167

1 Claim. (Cl. 210—3)

This invention relates to an apparatus for removing grit from the influent to a sewage disposal plant. It is the generally accepted practice to remove influent silt, sand, gravel and other grit at the intake of sewage treatment plants so that the grit will not settle out with the sludge and be delivered to the digester where it would accumulate, and will not reach and wear sludge pumps. It has been difficult, however, to remove the accumulated grit from the grit chamber in the past.

A general object of the present invention is a system for removing grit from a grit chamber which is more effective and reliable than known prior systems and, by reason of its economical construction and simple maintenance problems, will be relatively inexpensive.

Another object of the invention is a grit removal system which does not require plant shutdown or bypassing of the grit chamber in order to remove accumulated grit from the grit chamber.

An advantage of the grit removal apparatus is the lack of moving parts coming into contact with the grit in effecting its conveyance to a disposal point or depository, so that abrasion and wear of equipment caused by grit are negligible.

Described briefly in general terms, the invention contemplates in the grit chamber a low-velocity channel in which the grit settles. The bottom of this channel opens downwardly into, or includes, a relatively deep grit collection chamber preferably of materially smaller cross section than the transverse cross section of the channel, so that the grit settles in a fairly confined area. In the bottom of the grit collection chamber is located the suction intake of a pump or elevator of the hydraulic injection or jet type. This pump discharges into an upwardly inclined conduit which extends to a depository in the form of a decanting tank located at an elevation materially above the pump, and preferably substantially at ground level. The high-velocity pump jet flowing upwardly through the inclined conduit draws grit accumulations dropping into the pump intake from the grit chamber and carries such grit with it into the decanting tank which has an overflow for discharge of the liquid, while the grit settles to the bottom.

The pump need be operated only occasionally to clear the pump inlet and collection chamber bottom of grit accumulations before they become excessive. In an interval between intermittent operations of the hydraulic injector pump the decanting tank may be emptied of all liquid, as by removing a side wall of such tank, and a workman may shovel the grit out or otherwise remove it.

Other features, objects and advantages of the invention will be evident from the following description and the accompanying drawings.

Figure 3 is a vertical sectional view taken on line 3—3 in Figure 2.

Figure 4 is a vertical sectional view through the hydraulic injector pump in operation.

Figure 5 is a plan view of the hydraulic injector pump.

Figure 1:
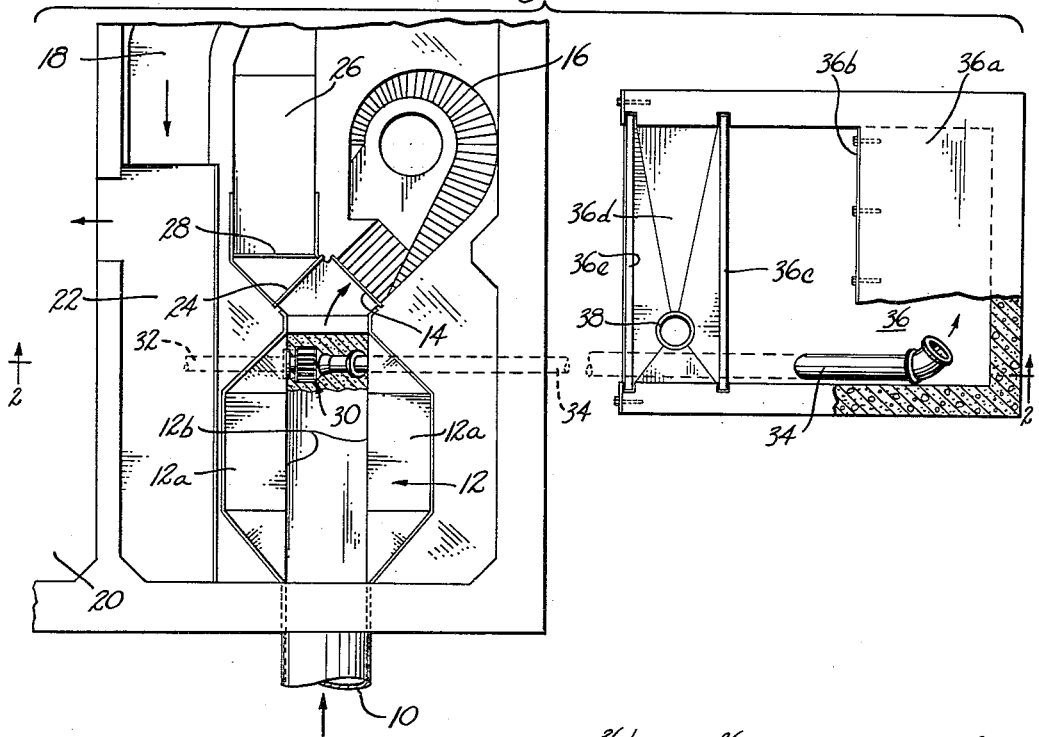
Figure 1 is a plan view of a portion of the influent section of the disposal plant including grit removing facilities incorporating the invention.

In Figure 1, the course of the influent through the initial stages of a disposal plant is shown by the arrows. The influent enters the plant through the sewer main pipe 10 and passes next through a wide low-velocity channel 12. From this channel the influent ordinarily flows through the passage controlled by slide gate 14 and into the comminutor unit 16 before passing through the flume 18, 22 into the primary clarifier 20. When the comminutor unit is to be shut down for cleaning or repairs, the slide gate 14 is closed and the bypass slide gate 24 is opened to permit flow of the influent through a by-pass flume 26 into the flume 18. A bar screen 28 located adjacent to the slide gate 24 prevents passage of large solid objects with the influent into the settling tank while the comminutor is out of operation.

In the low-velocity channel 12 of the grit chamber the side bays or wings 12a are relatively shallow, having inwardly and downwardly sloping bottom surfaces. The central portion 12b of this channel has vertical sides joining the sloping bottom surfaces and a hopper-like bottom including one face 12c which pitches rather steeply (Figure 3) from the inlet end of the channel to a base edge of maximum depth near the channel's outlet end, i. e. from right to left in Figure 3. This same section of bottom also slopes sidewise from one vertical side wall to the other. The remaining bottom surface of the central portion 12b comprises a shorter reversely sloping surface 12d extending upwardly from such base edge of the first-mentioned bottom surface 12c of channel portion 12b and terminating at the vertical end wall 12e of the section 12b at the outlet end of the low velocity channel 12.

This central portion 12b of the low-velocity channel constitutes the grit collection chamber in which the grit settles, first dropping onto the sloping bottom surface 12c, and finally sliding by gravity down the downwardly convergent sides of the grit collection chamber to the lowest portion of such chamber. The grit cannot easily be washed out of the grit collection chamber bottom by the continuing flow of sewage because of the vertical wall 12e at its downstream side. Below the bottom of the grit collection chamber is a grit concentrating sump 30a to which the grit collection chamber bottom converges. In this sump is installed the suction intake of a hydraulic injector pump or elevator 30 fed by water, which may be effluent liquid, under pressure through a pipe 32. Such pump discharges into and through a discharge pipe 34 extending at an incline upward from the grit chamber pocket to a decanting tank 36.

Figure 2:
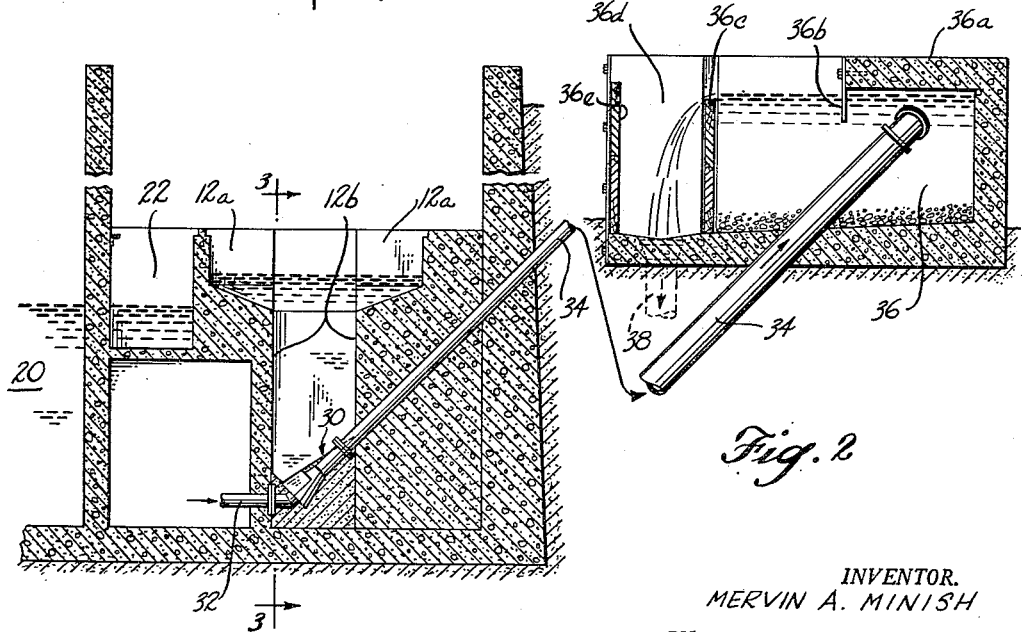
Figure 2 is a vertical sectional view taken on line 2—2 in Figure 1.

The discharge from conduit 34 into the main chamber or depository of the decanting tank 36, as shown in Figures 1 and 2, is directed upwardly and toward one end of the tank near its top. This end of the tank is covered by a plate 36a extending part way to the opposite end of the tank. The inner edge of this cover plate serves as a support for a depending baffle plate 36d serving to direct the swirling liquid downwarly toward the bottom of the decanting tank and lower its velocity before the liquid may pass over an overflow wier formed by the chamber side at or near the tank's opposite end, thereby improving the settling of the grit in the tank. This wall 36c separating the main section of the tank 36 from the overflow chamber 36d may be formed of removable boards. A drain pipe 38 in the bottom of overflow chamber 36d may extend to a wet well (not shown), or may empty into the sewer 10, or other suitable disposition may be made of the liquid discharged from pipe 34.

As shown in Figures 4 and 5 the hydraulic injector pump comprises the grit concentrating sump 30a to which the hopper bottom converges downwardly, open at its top to provide an inlet 30b into which grit moves by gravity action. Such inlet is covered by the grating 30c which excludes from the sump 30a rocks and other objects too large to pass through the pump exit and conduit 34. Such grating forms the bottom of the lowest point of the grit collection chamber hopper, as shown in Figures 2 and 3, so that the grit will drop directly into the pump inlet beneath such grating. The sump 30a is tapered toward the lower end of discharge pipe 34 to which it is connected. The large end wall 30d of the sump 30a supports the injector jet nozzle 30e directed lengthwise of the taper of the sump and toward conduit 34 as shown. Thus during supply of water under pressure through the pipe 32 to the nozzle 30e, a powerful jet is directed into the pipe 34 which forces ahead of it grit which falls into the sump beyond the nozzle, and creates a suction at the pump's inlet 30b for drawing additional grit accumulated in the sump, with some influent, from the sump and the bottom of the grit collection chamber into the pump venturi 30f for discharge with the jet through the pipe 34 and into the depository 36. The venturi section 30f, which may be of stepped formation as shown, reduces the pressure and creates suction by the action of the jet flowing into it.

Under operating conditions the grit accumulating in the bottom of the grit collection chamber 12b over a given fairly long period of time, such as a matter of several hours, may be removed from such chamber quickly, that is in a matter of a few minutes, by supplying liquid under pressure to the jet nozzle 30e. During operation of the injector pump 30 carrying grit from the chamber 12b to the depository 36, the sewage enters the disposal plant as usual, without diversion. Since the location of the suction inlet 30b of the pump 30 is well below the surface of the influent in the low-velocity channel 12 it has negligible tendency to draw suspended material into the conduit 34. The carrying force and capacity of the pump's injector stream will suspend and move the indrawn grit through the conduit 34, lifting it through the necessary height for deposit into the decanting tank 36, without requiring that any supplemental liquid be drawn from the chamber 12b, although some liquid of the sewage will always be drawn into the pump during removal of the last portion of the grit. The inclined disposition of pipe 34, instead of it being vertical, facilitates raising of the grit.

In the relatively long intervals between successive periods of operation of the jet pump 30 an attendant may enter the decanting tank 36 by taking out the outer side wall boards 36e and the inner side wall boards 36c in order to remove the grit from the bottom of the tank, such as by shovelling it into a wheelbarrow, for disposal purposes. Preferably the decanting tank is installed with its bottom substantially at ground level for convenience in cleaning out the tank, whereas the depth of the grit collection chamber will be governed largely by the physical requirements of the remaining portion of the plant, including the level of the sewer main 10. In every case the grit chamber pocket will be well below ground level, so that the conduit 34 to the decanting tank must necessarily extend upwardly.

In addition to the convenience and effectiveness of the present grit removal system, another advantage is its simplicity, involving no mechanical moving parts which would be worn by the grit. Accordingly the cost of maintenance during continued operation over a long span of years is low. At the same time the grit removal operation is performed in a reliably positive manner because of the location of the pump intake below the bottom of the grit collection chamber hopper.

I claim as my invention:

In a sewage disposal plant, a grit discharge conduit a considerable portion of which is inclined upwardly, a grit concentrating sump tapered toward and connected to the lower end of said discharge conduit, a grit collection chamber in the influent structure of the sewage disposal plant having a hopper shaped bottom convergent downwardly to the upper portion of said grit concentrating sump and terminating in a lower extremity of substantially the same size as the upper portion of said grit concentrating sump from which grit falls into said sump, and a grit removal pump including a venturi throat adjacent to the junction of said tapered grit concentrating sump and said grit discharge conduit and an injection nozzle extending through said grit concentrating sump lengthwise of its taper, directed toward said venturi throat but spaced a substantial distance from the junction of said grit concentrating sump and said grit discharge conduit and projecting a stream of liquid through the portion of said tapered grit concentrating sump adjacent to said grit discharge conduit and into said grit discharge conduit for removing from said sump by a combined propulsive force jet, gravity and suction action.

References Cited in the file of this patent

UNITED STATES PATENTS

| | | |
|---|---|---|
| 1,124,469 | Lawton | Jan. 12, 1915 |
| 1,295,056 | Otterson | Feb. 18, 1919 |
| 1,671,864 | Higgins | May 29, 1928 |
| 2,308,670 | Bolton | Jan. 19, 1943 |
| 2,517,117 | Komline | Aug. 1, 1950 |
| 2,652,926 | Jernigan | Sept. 22, 1953 |

FOREIGN PATENTS

| | | |
|---|---|---|
| 446,086 | Germany | June 21, 1927 |